(12) United States Patent
Komatsu

(10) Patent No.: US 6,797,660 B2
(45) Date of Patent: Sep. 28, 2004

(54) SILICON NITRIDE WEAR RESISTANT MEMBER AND MANUFACTURING METHOD THEREOF

(75) Inventor: Michiyasu Komatsu, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/805,035

(22) Filed: Mar. 14, 2001

(65) Prior Publication Data

US 2002/0010068 A1 Jan. 24, 2002

(30) Foreign Application Priority Data

Mar. 16, 2000 (JP) ........................................ 2000-073409
Feb. 16, 2001 (JP) ........................................ 2001-039991

(51) Int. Cl.[7] ........................ C04B 35/596; F16C 33/32
(52) U.S. Cl. ..................... 501/97.4; 501/97.2; 384/492; 384/907.1
(58) Field of Search ................ 501/97.1–97.4; 384/492, 907.1

(56) References Cited

U.S. PATENT DOCUMENTS

| | | | | |
|---|---|---|---|---|
| 4,743,571 A | * | 5/1988 | Steinmann et al. | 501/97.2 |
| 5,098,872 A | * | 3/1992 | Suyama et al. | 501/97.2 |
| 5,128,287 A | * | 7/1992 | Peuckert | 501/97.2 |
| 5,369,065 A | * | 11/1994 | Yoshimura et al. | 501/97 |
| 5,424,256 A | * | 6/1995 | Yoshimura et al. | 501/97 |
| 5,439,856 A | * | 8/1995 | Komatsu | 501/97.2 |
| 5,744,410 A | * | 4/1998 | Komatsu et al. | 501/97.2 |
| 5,908,796 A | * | 6/1999 | Pujari et al. | 501/97.1 |
| 5,914,286 A | * | 6/1999 | Collin et al. | 501/97.4 |
| 6,066,582 A | * | 5/2000 | Collin et al. | 501/97.2 |

FOREIGN PATENT DOCUMENTS

| | | | |
|---|---|---|---|
| DE | 3840171 | * | 5/1990 |
| JP | 63-319263 | | 12/1988 |
| JP | 1-093470 | | 4/1989 |
| JP | 5-178668 | | 7/1993 |
| JP | 6-122563 | | 5/1994 |
| JP | 2000-354901 | * | 12/2000 |

* cited by examiner

Primary Examiner—Karl Group
(74) Attorney, Agent, or Firm—Oblon, Spivak, McClelland, Maier, & Neustadt, P.C.

(57) ABSTRACT

Wear resistant member comprises a silicon nitride sintered body. Silicon nitride sintered body contains from 75 to 97% by mass of silicon nitride, from 0.2 to 5% by mass of titanium nitride and from 2 to 20% by mass of a grain boundary phase essentially containing Si—R—Al—O—N compound (R: rare earth element). Particles of titanium nitride are 1 μm or less in long axis. Particles of titanium nitride are mainly spherical particles of which aspect ratio is in the range of from 1.0 to 1.2, surface thereof being formed edgeless and roundish. Wear resistant member formed of such silicon nitride sintered body is excellent in strength, fracture toughness and rolling fatigue life. In particular, being excellent in rolling fatigue life, it is suitable for bearing member such as bearing balls.

16 Claims, No Drawings

SILICON NITRIDE WEAR RESISTANT MEMBER AND MANUFACTURING METHOD THEREOF

BACKGROUND OF THE INVENTION

1. Field of the Invention

The present invention relates to wear resistant member made of a sintered body essentially consisting of silicon nitride and a manufacturing method thereof, in particular relates to silicon nitride wear resistant member excellent in rolling fatigue life characteristics and a manufacturing method thereof.

2. Description of the Related Art

Wear resistant member is used in a variety of fields such as for instance bearing member, various kinds of roll materials for rolling, compressor vanes, gas turbine blades, and engine components such as cam roller or the like. For such wear resistant member, so far ceramic material has been used. In particular, silicon nitride sintered bodies, being excellent in wear resistance, are broadly used in a variety of fields.

Since the silicon nitride is sintered with a great difficulty, various compounds are added as sintered additive in manufacturing a sintered body. As existing compositions of the silicon nitride sintered body, such systems as silicon nitride-rare earth oxide-aluminum oxide and silicon nitride-rare earth oxide-aluminum oxide-titanium oxide are known. In these compositions, the sintered additive such as rare earth oxides is a component that forms, during the sintering, a grain boundary phase (glassy phase) consisting of Si—R—Al—O—N compound (R: rare earth element) to densify the sintered body, resulting in higher strength.

In the silicon nitride sintered body of an existing composition also, flexural strength, fracture toughness and wear resistance and the like are improved. However, these characteristics are not sufficiently improved. In particular, in the wear resistant member such as rolling bearing member, slide characteristics such as rolling fatigue life is in strong demand to be furthermore improved.

As to raw material composition of a silicon nitride sintered body, for instance Japanese Patent Laid-open Application No. HEI 1-93470 discloses the following. That is, a ceramic mixture containing, as sintered additive, from 1 to 10% by mass of rare earth oxide, from 1 to 10% by mass of aluminum oxide and from 0.1 to 5% by mass of titanium oxide, and the rest essentially consisting of silicon nitride is molded and sintered to obtain a sintered body. In the above publication, it is also disclosed that titanium oxide is segregated, after the sintering, in a grain boundary phase as titanium nitride or the like to promote densification of the sintered body, thereby contributing in an improvement of thermal shock resistance.

However, when titanium oxide is simply added to the raw material mixture to sinter, during the sintering, titanium oxide is rapidly converted into titanium nitride to tend to cause fluctuation in particle diameters of titanium nitride particles, resulting in coarse particles of titanium nitride. The coarse titanium nitride particle in the silicon nitride sintered body may be a starting point of crack due to the difference of thermal expansion coefficients between that of silicon nitride grain. Thereby, characteristics such as strength and fracture toughness may be deteriorated.

As to an improvement of wear resistance of a silicon nitride sintered body, Japanese Patent Laid-open Application No. HEI 6-122563 discloses the following. That is, in silicon nitride matrix of an average particle diameter of 10 $\mu$m or less, a Ti compound of which ratio (aspect ratio) of a long axis to a short axis is two or more is dispersed in the range from 1 to 50% by mass to prepare ceramic composite material. Here, as the Ti compound, whiskers essentially consisting of TiN, TiC or TiCN is used.

The Ti compound (TiN whisker, for instance) of which aspect ratio is two or more in the above publication shows an effect of improving strength and toughness of the sintered body. However, when using the silicon nitride sintered body in such as bearing member, rolling fatigue life tends to deteriorate, on the contrary. That is, when Ti whisker or the like large in shape anisotropy is present on a slide surface, it becomes a thorn like projection. The projection may be a starting point of fracture or may be highly aggressive against an opponent member.

Furthermore, Japanese Patent Laid-open Application No. HEI 5-178668 discloses a silicon nitride-titanium nitride composite sintered body in which fine particles of titanium nitride are dispersed in a matrix consisting of silicon nitride and grain boundary phase. The silicon nitride-titanium nitride composite sintered body contains silicon nitride in the range of from 45 to 95% by volume and is manufactured in the following ways. First, an organic precursor of silicon nitride containing Ti element is heat-treated to prepare fine crystalline composite powder of silicon nitride and titanium nitride. Then, a sintered additive is added to the fine composite powder to mix, the mixture being sintered to obtain a composite sintered body.

In the silicon nitride-titanium nitride composite sintered body thus obtained, fine particles of titanium nitride are mainly dispersed in grains of silicon nitride. The fine particles of titanium nitride, being different in thermal expansion coefficient from silicon nitride, cause residual compressive stress in the grains of silicon nitride. Such residual compressive stress works as resistance to a progress of crack, resulting in higher fracture toughness. However, in the use of external stress being continuously applied as in the case of a bearing member, the residual stress in the silicon nitride grains may cause peeling, on the contrary.

SUMMARY OF THE INVENTION

Accordingly, the object of the present invention is to provide wear resistant member that is, in addition to high strength and toughness, excellent in sliding characteristics, and a manufacturing method thereof. The present invention intends to provide wear resistant member that is improved in rolling fatigue life in particular to be suitable for bearing member, and a manufacturing method thereof.

The wear resistant member of the present invention is one comprising a silicon nitride sintered body, the silicon nitride sintered body comprising silicon nitride, titanium nitride particles having long axis is 1 $\mu$m or less, and a grain boundary phase mainly containing a Si—R—Al—O—N compound (here, R denotes a rare earth element) in the ranges of from 75 to 97% by mass, from 0.2 to 5% by mass and from 2 to 20% by mass, respectively.

In the wear resistant member of the present invention, the titanium nitride particles are preferable to be singly particle-dispersed in the silicon nitride sintered body. In other words, titanium nitride, without being dissolved as a solid solution in silicon nitride or grain boundary phase, is present as titanium nitride particles. The titanium nitride particles are particularly preferable to be dispersed mainly in the grain boundary phase.

A method of manufacturing the wear resistant member of the present invention is one of manufacturing wear resistant member comprising silicon nitride sintered body, having the following steps. That is, the present method of manufacturing a silicon nitride sintered body comprises the steps of preparing a mixture of raw material, molding the mixture of raw material into a desired shape, heat-treating after degreasing, and sintering to prepare a silicon nitride sintered body. In the step of preparing a mixture of raw material, to silicon nitride powder that contains oxygen by 1.7% by mass or less and α-silicon nitride by 90% by mass or more and of which average particle diameter is 1.0 μm or less, rare earth compound, titanium nitride or titanium compound converting into the titanium nitride due to the sintering, aluminum oxide and aluminum nitride are added by the following amounts, respectively. That is, the rare earth compound is added by 0.5 to 10% by mass in terms of oxide thereof. The titanium nitride of which average particle diameter is 0.7 μm or less or titanium compound converting into titanium nitride due to the sintering is added by 0.1 to 5% by mass in terms of titanium nitride. The aluminum oxide is added by 0.1 to 5% by mass. The aluminum nitride is added in the range of 5% by mass or less. In the step of heat-treating after degreasing, the body obtained in the step of molding, after degreasing, is heat-treated at a temperature in the range of from 1300 to 1450° C. In the step of sintering to prepare the silicon nitride sintered body, the molded body undergone the heat-treatment is sintered at a temperature in the range of from 1600 to 1900° C. to prepare the silicon nitride sintered body.

In the method of manufacturing wear resistant member of the present invention, titanium nitride or the titanium compound converting into titanium nitride due to the sintering is preferable to be added divided in a plurality of times. Furthermore, the mixture of raw materials is preferable to contain titanium oxide of an average particle diameter of 0.5 μm or less in the range of from 0.1 to 5% by mass in terms of titanium nitride. The method of manufacturing the wear resistant member of the present invention is further preferable to comprise a step of HIP-treating the silicon nitride sintered body obtained in the above sintering step in a non-oxidizing atmosphere of 300 atm or more at a temperature of from 1600 to 1850° C.

In the wear resistant member of the present invention, particles of titanium nitride are dispersed in the silicon nitride sintered body. The particles of titanium nitride, while existing mainly in a grain boundary phase to strengthen the grain boundary phase, contribute in an improvement of strength and fracture toughness of the silicon nitride sintered body. However, the particles of titanium nitride, when large in the particle diameter, disconnect locally between the grain boundary phases to cause intercrystalline crack. Alternatively, the particles of titanium nitride are different in thermal expansion coefficient from that of the grains of silicon nitride, as a result, a contact portion between the particle of titanium nitride and grain of silicon nitride can be a starting point of crack. From these, strength and fracture toughness of the silicon nitride sintered body are deteriorated, on the contrary.

Here, in the present invention, the particles of titanium nitride of which long axis is 1 μm or less are effected to exist in the silicon nitride sintered body. Such fine particles of titanium nitride, being well dispersed in the grain boundary phase, can dispersion-reinforce the grain boundary phase with reproducibility. Thereby, strength, fracture toughness and sliding characteristics of the silicon nitride sintered body can be improved. The particles of titanium nitride to be dispersed in the silicon nitride sintered body are preferable to have an aspect ratio in the range of from 1.0 to 1.2. Such particles, when contained by 80% by volume or more, can improve rolling fatigue life in particular. Furthermore, the particles of titanium nitride are desirable to have roundish shape.

The particles of titanium nitride as mentioned above can be obtained with reproducibility by applying the manufacturing method of the present invention. In particular, in addition to the use of fine titanium oxide as the formation raw material of titanium nitride, by holding, in the course of raising up to a sintering temperature (1600 to 1900° C.), at a temperature in the range of from 1300 to 1450° C., the particles of titanium nitride can be dispersed in the silicon nitride sintered body controlled in shape and state of dispersion. Thereby, the wear resistant member excellent in rolling fatigue life characteristics in particular can be provided.

DESCRIPTION OF THE PREFERRED EMBODIMENTS

In the following, modes for implementing the present invention will be explained.

The wear resistant member of the present invention consists of a silicon nitride sintered body, the silicon nitride sintered body comprising silicon nitride, particles of titanium nitride of which long axis is 1 μm or less, and a grain boundary phase mainly containing Si—R—Al—O—N compound (here, R denotes a rare earth element) in the ranges of from 75 to 97% by mass, 0.2 to 5% by mass and 2 to 20% by mass, respectively. The silicon nitride sintered body in the present invention is a sintered body containing of silicon nitride as a primary component, the silicon nitride is contained in the range of from 75 to 97% by mass.

When an amount of the silicon nitride in the sintered body is less than 75% by mass, an amount of sintered additives including a formation component of titanium nitride becomes relatively larger to result in the deterioration of sliding characteristics such as flexural strength, fracture toughness and rolling fatigue life. On the contrary, when the amount of silicon nitride exceeds 97% by mass, an amount of the added sintered additives becomes relatively smaller, accordingly an effect of densifying due to the sintered additives cannot be fully obtained. The amount of the silicon nitride in the sintered body is more preferable to be in the range of from 80 to 95% by mass.

The silicon nitride sintered body to use as wear resistant member contains particles of titanium nitride of having a long axis is 1 μm or less in the range of from 0.2 to 5% by mass. When a content of titanium nitride is less than 0.2% by mass, an effect of improving performance due to titanium nitride cannot be sufficiently obtained. On the other hand, when the content of titanium nitride exceeds 5% by mass, flexural strength, fracture toughness and rolling fatigue life of the sintered body deteriorate on the contrary. The content of titanium nitride is more preferable to be in the range of from 0.5 to 4% by mass.

The particles of titanium nitride exist mainly in the grain boundary phase of the sintered body, thereby reinforcing the grain boundary phase to contribute in an improvement of performance of the silicon nitride sintered body. Thus, titanium nitride, without dissolving in silicon nitride and grain boundary phase to form solid solution, is dispersed in the sintered body as titanium nitride particles. When titanium nitride reacts with silicon nitride or the grain boundary phase, an effect of reinforcement due to particle dispersion cannot be obtained. Whether titanium nitride forms a solid solution or not can be observed by means of TEM.

However, when the long axis of the particle of titanium nitride exceeds 1 μm, flexural strength, fracture toughness and rolling fatigue life of the sintered body deteriorate, on the contrary. That is, when there are coarse particles of titanium nitride, inter-crystalline connection of the grain boundary phases is locally disconnected to cause crack. Furthermore, titanium nitride is larger in thermal expansion coefficient than silicon nitride is. Accordingly, when there are coarse particles of titanium nitride, based on the difference of the thermal expansion coefficient from that of the grain of silicon nitride, crack tends to occur. Thus, the coarse particles of titanium nitride deteriorate flexural strength, fracture toughness and rolling fatigue life of the sintered body, on the contrary.

Furthermore, the particles of titanium nitride, when being agglomerated, adversely affect on the grain boundary phase. Accordingly, the particles of titanium nitride are preferable to be singly dispersed. An agglomerated state of particles of titanium nitride is a state where particles of titanium nitride each come into direct contact with each other to agglomerate. The particles of titanium nitride reinforce the grain boundary phase. However, when there are points where the particles of titanium nitride agglomerate, upon receiving sliding shock as the wear resistant member, there occurs fluctuation in the ways receiving stress. Thereby, the rolling fatigue life is deteriorated.

In consideration of the aforementioned influence of the particles of titanium nitride, in the present invention, the particles of titanium nitride having a long axis is 1 μm or less are dispersed in the silicon nitride sintered body. The long axis of the particles of titanium nitride is more preferable to be 0.5 μm or less. The long axis in the present invention is a length of the longest diagonal of the particle of titanium nitride. There is no problem when a size of a particle of titanium nitride can be measured 3-dimensionally. However, it is general practice to use a simplified method. In the simplified method, an enlarged photograph of an arbitrary unit area (100×100 μm, for instance) is taken, the longest diagonal of the particles of titanium nitride present in the enlarged photograph being measured as a long axis to use. In particular, also in the shape measurement of the roundish titanium nitride particle described below, the use of an enlarged photograph is effective.

The measurement using such enlarged photograph is effective also in the measurements of a long axis, an aspect ratio, the difference between the long and short axes, and furthermore porosity and the maximum pore diameter of a particle of titanium nitride provided in the present invention. For each measured value based on the measurement by the use of an enlarged photograph, the measurements are repeated on at least three points in an arbitrary unit area and the obtained values are averaged to obtain an average value thereof. An area of measurement is a range of 100×100 μm, for instance. A magnification of the enlarged photograph is enough to be 2000 times or more.

The particles of titanium nitride in the sintered body are preferable to contain 80% by volume or more of particles of which aspect ratio that shows a ratio of long axis to short axis (long axis/short axis) is in the range of from 1.0 to 1.2. When the ratio of slim particles of which aspect ratio exceeds 1.2 exceeds 20% by volume, there occur anisotropy and fluctuation in the reinforcement of the grain boundary phase. Thereby, the rolling fatigue life performance or the like of the silicon nitride sintered body is likely to be partially deteriorated. The aspect ratio of the particles of titanium nitride is more preferable to be in the range of from 1.0 to 1.1. Furthermore, the ratio of the particles having the above aspect ratio is more preferable to be 90% by volume or more. A short axis of a particle of titanium nitride, on the contrary to the aforementioned long axis, is a length of the shortest diagonal, being measured by the method identical with that for the long axis.

The difference between the long and short axes of a particle of titanium nitride is preferable to be 0.2 μm or less. That is, by dispersing the particles of titanium nitride having more spherical shape mainly in the grain boundary phase, resistance against sliding shock as an entire sintered body can be improved. Accordingly, the sliding performance such as rolling fatigue life of the wear resistant member using the silicon nitride sintered body can be furthermore improved. When the difference between the long and short axes of a particle of titanium nitride becomes larger, the shape of the particle of titanium nitride becomes essentially oblongish, causing fluctuation in an influence on the grain boundary phase. This causes fluctuation in various characteristics of the silicon nitride sintered body and also causes deterioration of the rolling fatigue life.

Furthermore, a surface shape of a particle of titanium nitride is preferable to be a roundish shape with no edge. Particles of titanium nitride with edge like fiber and whisker adversely affect on sliding performance such as rolling fatigue life or the like, on the contrary. Accordingly, it is preferable to disperse roundish particles of titanium nitride with no edge in the sintered body. That is, a silicon nitride sintered body that is fiber-reinforced is so far known, and there is no problem in applying this in a structural material that does not have a direct sliding part like a gas turbine blade. However, in the bearing member such as bearing balls or the like, a surface of the silicon nitride sintered body becomes a sliding surface as it is. As a result, the fiber or whisker is exposed on the sliding surface thereof, becoming a starting point of fracture to deteriorate rolling fatigue life performance, on the contrary.

A roundish shape with no edge here means that, when observing a particle of titanium nitride from an arbitrary direction, there is no projection of a sharp angle of 90 degrees or less on the surface of the particle of titanium nitride. An ordinary particle has microscopic unevenness on a surface thereof, among them there being portions of a sharp angle of 90 degrees or less. When repeating sliding operation or implementing continuous sliding as the wear resistant member, such portions of sharp angle tends to be a starting point of crack in the grain boundary phase to deteriorate the rolling fatigue life performance.

From the above, in the present wear resistant member, it is preferable to disperse essentially spherical particles of titanium nitride in the sintered body. According to the essentially spherical particles of titanium nitride, the grain boundary phase can be uniformly reinforced and the sliding shock can be effectively relieved. In addition thereto, since the reinforcement member does not become a starting point of fracture, the sliding performance such as the rolling fatigue life or the like can be markedly improved, accordingly. Such silicon nitride sintered body, though applicable in various kinds of wear resistant members, is particularly effective in the bearing member like a bearing ball all surface of which becomes a sliding portion.

The aforementioned sharp angle portion of particles of titanium nitride can be confirmed by observing the particles of titanium nitride in an enlarged photograph with a magnification of 10,000 times, for instance (this enlarges 1 μm to 10 mm). In the particle of titanium nitride that is substantially spherical or oblong infinitely close to a sphere, when observed from any direction, the portion of a sharp angle of 90 degrees or less is not confirmed. In the wear resistant member of the present invention, it is preferable to disperse such particles of titanium nitride in the sintered body.

The edgeless and roundish particles of titanium nitride can be obtained by compounding in advance particles of titanium nitride of such shape in a raw material mixture to disperse. In particular, as detailed below, powder of titanium compounds such as oxide, carbide, boride and silicide of titanium can be converted into particles of titanium nitride during the sintering. By the application of this method, the edgeless and roundish particles of titanium nitride can be dispersed in the sintered body at low cost and with good reproducibility.

In particular, powder of titanium oxide, being chemically stable, is easy to handle, and furthermore exhibiting an excellent effect in an improvement of strength of the sintered body. Usually when sintering a silicon nitride sintered body, a silicon nitride molded body, after molding into a prescribed shape, is sintered. Accompanying the conversion of titanium oxide into titanium nitride, oxygen liberated from titanium oxide reacts with the grain boundary phase to depress the melting point of the grain boundary phase to promote the densification thereof. Accordingly, the strength of the silicon nitride sintered body can be further improved.

The silicon nitride sintered body constituting the present wear resistant member contains 2 to 20% by mass of a grain boundary phase that mainly includes a Si—R—Al—O—N compound (R: rare earth element). When the content of the grain boundary phase is less than 2% by mass, the silicon nitride sintered body cannot be sufficiently densified to increase porosity, resulting in the deterioration of flexural strength or fracture toughness. On the other hand, when the content of the grain boundary phase exceeds 20% by mass, an excess grain boundary phase is formed to result in the deterioration of flexural strength, fracture toughness and rolling fatigue life of the silicon nitride sintered body. The content of the grain boundary phase is preferable to be in the range of from 5 to 15% by mass.

The method of formation of the grain boundary phase substantially consisting of a Si—R—Al—O—N compound is not particularly restricted. However, it is preferable to add formation components of the Si—R—Al—O—N compound as sintered additives to form the grain boundary phase. In forming the above grain boundary phase, rare earth and aluminum compounds can be effectively added as the sintered additive.

The rare earth compound, though not particularly restricted, is preferable to be at least one kind selected from oxides, nitrides, borides, carbides and silicides of yttrium (Y), lanthanum (La), cerium (Ce), samarium (Sm), neodymium (Nd), dysprosium (Dy) and erbium (Er). In particular, because of the ease with which the grain boundary phase essentially consisting of the Si—R—Al—O—N compound is formed, it is preferable to use an oxide of Y, Ce, Sm, Nd, Er or the like.

As the aluminum compound, one that contains aluminum can be used without particular restriction. However, aluminum oxide and aluminum nitride can be preferably used. These aluminum compounds form the Si—R—Al—O—N compound with ease during the sintering. In particular, by adding both aluminum oxide and aluminum nitride together, the grain boundary phase essentially consisting of the Si—R—Al—O—N compound is easily formed. Constituent components of the grain boundary phase can be measured by means of EPMA.

When an amount of the grain boundary phase essentially consisting of the Si—R—Al—O—N compound in the silicon nitride sintered body is finally in the range of from 2 to 20% by mass, contents of the rare earth compound and aluminum compound are not particularly restricted. It is preferable, however, for the rare earth compound to be added in the range of from 0.5 to 10% by mass in terms of oxide and for the aluminum compound to be added in the range of from 0.1 to 10% by mass. When aluminum oxide and aluminum nitride are used together as the aluminum compound, the content of aluminum nitride is preferable to be 5% by mass or less, being further preferable to be 3% by mass or less. The content of aluminum oxide at that time is preferable to be in the range of from 0.1 to 5% by mass.

So far, indispensable components of the silicon nitride sintered body constituting the present wear resistant member have been explained. Needless to say, the silicon nitride sintered body may comprise other components. In order to densify furthermore the silicon nitride sintered body, oxides, nitrides, borides and silicides of magnesium (Mg), hafnium (Hf), zirconium (Zr) and tungsten (W) may be contained. In particular, magnesium oxide is effective in densifying the silicon nitride sintered body. A total content of these compounds is preferable to be in the range of from 0.1 to 5% by mass.

Furthermore, in the silicon nitride sintered body constituting the wear resistant member of the present invention, in view of satisfying fundamental strength and mechanical performance, the porosity thereof is preferable to be 0.5% by volume or less. In addition, a long axis of the pore is preferable to be 2 μm or less. In the case of the porosity of the silicon nitride sintered body exceeding 0.5% or the long axis thereof exceeding 2 μm, if the aforementioned constitution of the grain boundary phase and the particles of titanium nitride were satisfied, the fundamental flexural strength and sliding performance might be deteriorated.

The porosity of the silicon nitride sintered body is further preferable to be 0.3% or less. The porosity of the silicon nitride sintered body is normally preferable to be substantially zero. However, in the present invention, the porosity to an extent of approximately 0.01 to 0.5% in the silicon nitride sintered body can give excellent strength characteristics and rolling fatigue life performance. Furthermore, the long axis of the pore is further preferable to be 1 μm or less.

Next, a method of manufacturing the wear resistant member of the present invention will be explained. The silicon nitride wear resistant member of the present invention, when a configuration containing a prescribed particles of titanium nitride and grain boundary phase as mentioned above is obtained, is not particularly restricted in the manufacturing method. However, the following manufacturing method can be effectively applied.

Of powder of silicon nitride, though α and β phases are known, in the present invention, α phase is preferable. Powder of silicon nitride raw material is preferable to contain 90% by mass or more of α phase. Furthermore, it is more preferable to use the powder of silicon nitride containing 95% by mass or more of α phase.

Furthermore, the powder of silicon nitride raw material is preferable to be 1 μm or less in its average particle diameter and to contain 1.7% by mass or less of oxygen. By the use of such fine and impurity-less powder of silicon nitride, the silicon nitride sintered body small in the porosity and in the maximum pore diameter and high in the strength can be obtained with ease. An average particle diameter of the powder of the silicon nitride raw material is more preferable to be in the range of from 0.4 to 0.8 μm. In addition, the oxygen content is more preferable to be in the range of from 0.5 to 1.5% by mass.

Raw material of titanium nitride, when the compound as the raw material can finally make the long axes of the particles of titanium nitride 1 μm or less, is not particularly restricted. However, it is preferable to use powder of raw material of which average particle diameter is 0.7 μm or less. As the raw material of titanium nitride, titanium nitride powder itself can be used. However, in particular, the titanium compound that forms titanium nitride when sintering oxide, carbide, boride and silicide of titanium can be preferably employed. Thereby, the particles of titanium nitride fine in size and excellent in sphericity (edgeless and roundish particles of titanium nitride) can be obtained at low cost and with reproducibility.

When the compound such as titanium oxide that becomes titanium nitride due to a reaction during the sintering as the raw material of titanium nitride, it is preferable to employ fine powder of which average particle diameter is 0.5 μm or less. Thereby, the long axes of the particles of titanium nitride in the silicon nitride sintered body can be finally made 1 μm or less with ease. When making the particles of titanium nitride finer, the temperature conditions during the sintering described below can affect. The titanium compound that becomes titanium nitride during the sintering is added in the range of from 0.1 to 5% by mass in terms of titanium nitride.

In rare earth compounds and aluminum compounds and furthermore in other additives, it is preferable to use fine powder of an average particle diameter of 1 μm or less. For each powder of raw material, not one having thorn-like projection on a surface like fiber or whisker, powder-like one is preferably used. As mentioned above, the fiber or whisker projects on a sliding surface to enhance aggression against an opponent member, or a thorn-like protrusion becomes a starting point of fracture to deteriorate the wear resistance such as the rolling fatigue life. For the titanium compounds that are formation components of titanium nitride, it is not particularly preferable to use the fiber or whisker.

Each of the aforementioned additive powder is added by a prescribed amount to the powder of silicon nitride raw material, followed by addition of an organic binder and a dispersing medium, further followed by well mixing. Thereafter, by applying a known molding method such as uniaxial pressing or rubber pressing, it is molded into a desired shape. In mixing raw material powders each, the titanium compound in particular is mixed to disperse uniformly. More specifically, it is preferable that the powder of titanium compound is divided in a plurality of times, preferably in three or more times, to add and mix. Thereby, the titanium compound is prevented from agglomerating with itself to result in easily obtaining a state where the particles of titanium nitride each are singly dispersed. When adding the powder of titanium nitride divided in a plurality of times, it is effective to add with an interval of 30 min or more between successive additions to mix.

Next, the above molded body is degreased to prepare a degreased molded body. The degreased molded body, when sintering at a temperature of from 1600 to 1900° C., is held first at a temperature of from 1300 to 1450° C. for a prescribed time period. Before raising up to a sintering temperature, by heat-treating at a temperature in the range of from 1300 to 1450° C., the titanium compound such as titanium oxide can be converted into titanium nitride with less fluctuation in a state of conversion.

Thus, by previously converting the titanium compound such as titanium oxide into titanium nitride, coarse particles of titanium nitride can be suppressed from forming, thereby the particles of titanium nitride of which long axes are 1 μm or less being obtainable with reproducibility. Furthermore, the edgeless and roundish particles of titanium nitride can be obtained. As to the aspect ratio and the difference between long and short axes of the particle of titanium nitride, the above conditions can be satisfied. Even when the powder of titanium nitride is used as the raw material of titanium nitride, by previously holding at a temperature of from 1300 to 1450° C., the particles of titanium nitride can be prevented from agglomerating.

When the temperature of heat-treatment prior to the sintering is lower than 1300° C., the titanium compound cannot be sufficiently promoted in converting into titanium nitride, being likely to result in more fluctuation in the shape or the like of the particles of titanium nitride. On the contrary, when the temperature of heat-treatment exceeds 1450° C., there is no difference between an actual sintering, that is, the heat-treatment before the sintering being implemented without effect. Resultantly, the particles of titanium nitride cannot be suppressed from growing coarser.

It is preferable to hold in the range of from 30 to 120 min in the aforementioned heat-treatment (1300 to 1450° C.). When the holding time is less than 30 min, prior to the sintering, the titanium compound is insufficiently converted into the particles of titanium nitride. As a result, the coarser particles of titanium nitride are formed or a ratio of the particles of titanium nitride of which aspect ratio is large is increased. For instance, when titanium nitride is formed due to a nitriding reaction of titanium oxide or the like, different holding temperatures and holding times cause fluctuation in a state of conversion into titanium nitride, resulting in deterioration of the strength and various performances of the silicon nitride sintered body.

After all, by heat-treating at a prescribed temperature and holding time, the titanium compound can be excellently and uniformly converted into titanium nitride. Thereby, the size and shape of each particle of titanium nitride can be suppressed from fluctuating, the long axis of the particle of titanium nitride being made 1 μm or less, in addition to these, roundish particle of titanium nitride being obtained with reproducibility.

The heat-treatment prior to the sintering is not restricted to holding at a definite temperature in the range of from 1300 to 1450° C. for a prescribed time period. For instance, by sufficiently lowering a temperature raising speed in the temperature range of from 1300 to 1450° C., the identical effect can be obtained. At that time, the temperature raising speed is preferable to be set at 100° C./hr or less, being more preferable to be set at 50° C./hr or less.

Furthermore, an atmosphere during the aforementioned heat-treatment is preferable to be an inert atmosphere of 1 atm or less. In particular, when the heat-treatment is implemented in an inert atmosphere of 0.5 atm or less, an unnecessary gaseous component, for instance, a slight amount of carbon component remaining after the degreasing, becomes to be easily drawn out. Thereby, the silicon nitride sintered body of small porosity can be obtained with ease.

After the aforementioned heat-treatment, by sintering at a temperature in the range of from 1600 to 1900° C., the silicon nitride sintered body is obtained. For the sintering, a variety of sintering methods such as atmospheric sintering, pressure sintering (hot pressing), atmospheric pressure sintering and HIP (Hot Isostatic Pressing) sintering can be applied. Furthermore, such as implementing the HIP treatment after the atmospheric sintering, a plurality of sintering methods can be combined to use. In particular, when the wear resistant member of the present invention is applied in the bearing member such as bearing balls, the HIP treatment can be effectively implemented after the atmospheric sintering. The HIP treatment is preferably applied by holding under a pressure of 300 atm or more and a temperature in the range of from 1600 to 1850° C. for a prescribed time period.

The wear resistant member of the present invention can be applied in a variety of kinds of members for which the wear resistance is required. For instance, such as bearing member, various kinds of roll materials such as one for rolling, compressor vanes, gas turbine blades and engine member such as cam rollers can be cited. In particular, to the bearing member such as bearing balls of which entire surface is a sliding portion, the wear resistant member of the present invention is effective.

Needless to say, the silicon nitride sintered body to be used as wear resistant member, as demands arise, may undergo finish machining such as polishing or coating. In other words, when the silicon nitride sintered body can be used as the wear resistant member as it is, the silicon nitride sintered body becomes directly the wear resistant member.

Next, specific embodiments and results of evaluation of the present invention will be described.

Embodiment 1

To 87.5% by mass of $Si_3N_4$ (silicon nitride) raw material powder, as the sintered additive, 5% by mass of $Y_2O_3$ (yttrium oxide) powder of an average particle diameter of 0.9 μm, 3% by mass of $Al_2O_3$ (aluminum oxide) powder of an average particle diameter of 0.7 μm and 3% by mass of AlN (aluminum nitride) powder of an average particle diameter of 1.0 μm are added. Here, the $Si_3N_4$ raw material powder contains 1.3% by mass of oxygen and 97% by mass of α phase silicon nitride, and has an average particle diameter of 0.55 μm. Furthermore, $TiO_2$ (titanium oxide) powder of an average particle diameter of 0.3 μm is added by 1.5% by mass in terms of titanium nitride. The $TiO_2$ powder is divided into three portions to add with an interval of 30 min. These, after wet mixing for 72 h in ethyl alcohol with silicon nitride balls, are dried to prepare a mixture of raw materials.

Next, to the obtained mixture of raw materials, a prescribed amount of organic binder is added to prepare granulated powder, followed by pressing under a pressure of 98 MPa to mold. Thereby, a number of molded bodies of 50×50×5 mm are prepared for flexural strength measurement, a number of cylindrically molded bodies of diameter 80 mm×thickness 6 mm being prepared for rolling fatigue life measurement, respectively.

The obtained molded bodies each are degreased at 450° C. in a stream of air for 4 h, thereafter followed by holding in a nitrogen gas atmosphere of 0.1 atm under the conditions of 1350° C.×1 hr, further followed by sintering in a nitrogen gas atmosphere under the conditions of 1750° C.×4 h. Then, the obtained sintered bodies are HIP treated in a nitrogen gas atmosphere under the conditions of 1700° C.×1 h to prepare silicon nitride sintered bodies involving Embodiment 1.

COMPARATIVE EXAMPLES 1–3

As comparative example 1, except for without adding $TiO_2$, under the same conditions with Embodiment 1, a silicon nitride sintered body is prepared. For comparative example 2, except for the use of $TiO_2$ powder of an average particle diameter of 2 μm, under the same conditions with Embodiment 1, a silicon nitride sintered body is prepared. For comparative example 3, except for, in addition to the use of $Si_3N_4$ (silicon nitride) raw material powder containing 1.7% by mass of oxygen and 91% by mass of α phase silicon nitride and having an average particle diameter of 1.5 μm, an entirety of $TiO_2$ powder being added at once, under the same conditions with Embodiment 1, a silicon nitride sintered body is prepared.

Of silicon nitride sintered bodies each thus obtained in Embodiment 1 and Comparative Examples 1 through 3, porosity, maximum pore diameter, range of particle diameters of titanium nitride particles (minimum and maximum values of long axis are shown), difference of long and short axes of titanium nitride particles, ratio that titanium nitride particles of which aspect ratio is in the range of from 1.0 to 1.2 occupy, three point flexural strength at room temperature, and fracture toughness due to microindentation method are measured, respectively. Furthermore, by the use of a thrust bearing testing machine, under the following conditions, test is kept going until a surface of a silicon nitride disc is peeled off to measure the rolling fatigue life (number of repetition). The conditions above are that opponent material is SUJ2 steel ball provided by JIS G-4805, load being 39.2 MPa, a number of rotation being 1200 rpm and oil bath lubrication being due to turbine oil. The measurements are shown in Table 1.

The porosity, maximum pore diameter, range of particle diameters of dispersed titanium nitride particles, difference of long and short axes of titanium nitride particle and ratio of titanium nitride particles of which aspect ratio is in the range of from 1.0 to 1.2 are measured in the following ways. That is, with an arbitrary unit area (100×100 μm), enlarged photographs are taken for a total of three points of one on a surface and two on a section. For unit areas each, the above values are measured to obtain an average value. For the difference of long and short axes of titanium nitride particle, measurement is carried out on a titanium nitride particle having a maximum long axis in the arbitrary unit area.

TABLE 1

| | A (*1) | B (*2) | C (*3) | D (*4) | E (*5) | F (*6) | G (*7) | H (*8) |
|---|---|---|---|---|---|---|---|---|
| Embodiment 1 | 0.1 | 1 | 0.05–0.5 | 0.1 | 100 | 1200 | 7.5 | >1 × 10⁸ |
| Comparative Example 1 | 0.1 | 1 | — | — | — | 1000 | 6.5 | 1 × 10⁶ |
| Comparative Example 2 | 0.1 | 1 | 0.2–2.5 | 0.3 | 90 | 980 | 6.4 | 2 × 10⁶ |
| Comparative Example 3 | 0.4 | 2 | 0.08–1.2 | 0.5 | 50 | 900 | 5.9 | 9 × 10⁵ |

(*1): Porosity (%)
(*2): Maximum Pore Diameter (μm)
(*3): Range of Particle Sizes of TiN Particles (μm)
(*4): Difference of Long and Short Axes of TiN Particle (μm)
(*5): Ratio of TiN Particles of Low Aspect Ratio (%) (Ratio that TiN particles of which aspect ratio is in the range of from 1.0 to 1.2 occupy)
(*6): Three Point Flexural Strength (MPa)
(*7): Fracture Toughness (MPa · m^{1/2})
(*8): Rolling Fatigue Life (times)

As evident from Table 1, the silicon nitride sintered body of Embodiment 1 is excellent in all of three point flexural strength, fracture toughness and rolling fatigue life. In addition, it is found that there is no coagulation between titanium nitride particles, a grain boundary phase being formed of Si—Y—Al—O—N compound. Furthermore, titanium nitride is not found to dissolve in the grain boundary phase.

Whereas, Comparative Example 1, due to lack of titanium nitride, is poor in properties. Furthermore, even when titanium nitride particles are contained as in Comparative Example 2, when the long axis exceeds 1 μm, properties deteriorate. It is considered that the titanium nitride particles in the grain boundary, being too large, adversely affect on biding force of the grain boundary or the like.

On the other hand, the silicon nitride sintered body of Comparative Example 3, being 1.5 μm, which exceeds a preferable range of 1 μm of the present invention, in an average particle diameter of powder of silicon nitride raw material, decreases in the porosity. In addition to the above, the maximum pore diameter increases. Due to these, even if the shape of titanium nitride particles is similar, properties are considered to deteriorate. Furthermore, the entire $TiO_2$ powder is added at one time to mix. Accordingly, part of titanium nitride particles is agglomerated with each other to exceed 1 μm in the long axis of titanium nitride particle and further to exceed 0.2 μm in the difference of the long and short axes, resulting in deterioration of properties.

Though not shown in Table 1, all of the titanium nitride particles of Embodiment 1 and Comparative Examples 2 and 3, being formed through nitridation of the added titanium oxide, are edgeless and roundish in their shapes. One of Embodiment 1, as shown in Table 1, is 0.1 μm in the difference of the long and short axes of titanium nitride particle. This is because, due to the heat-treatment (holding treatment) during the nitridation of $TiO_2$ powder, the $TiO_2$ powder is almost uniformly nitrided. Thereby, it is considered that the titanium nitride particles are formed into a substantial sphere or an ellipse limitlessly close to a sphere.

Embodiment 2

The compounded/granulated powder prepared similarly with Embodiment 1, after being preliminarily molded spherical by means of a mold, undergoes cold isostatic pressing under a pressure of 98 MPa to prepare a number of spherically molded bodies of a diameter 11 mm for crushing strength and rolling fatigue life measurements. These molded bodies are, under the identical conditions with that of Embodiment 1, degreased, heat-treated (holding treatment), sintered and HIP treated to obtain dense sintered bodies. Next, the sintered bodies after the HIP treatment are polished into balls of a diameter 9.52 mm and a surface roughness Ra of 0.01 μm to prepare silicon nitride wear resistant member capable of being used as bearing balls. The surface roughness Ra is a center line average height measured along on an equator of the ball by means of a tracer method of surface roughness.

Comparative Examples 4 through 6

For Comparative Example 4, except for the use of compounded/granulated powder prepared in Comparative Example 1, under the identical conditions with Embodiment 2, silicon nitride balls are prepared. Similarly, for Comparative Examples 5 and 6, except for the use of the compounded/granulated powders prepared in Comparative Examples 2 and 3 respectively, under the identical conditions with Embodiment 2, silicon nitride balls are prepared, respectively.

Of thus obtained silicon nitride balls involving Embodiment 2 and Comparative Examples 4–6, porosity, maximum pore diameter, range of particle diameters of titanium nitride particles (minimum and maximum values of long axes are shown), difference of long and short axes of titanium nitride particles, ratio of titanium nitride particles of which aspect ratio is in the range of from 1.0 to 1.2, crushing strength at room temperature, and fracture toughness due to microindentation method are measured, respectively. Furthermore, by the use of a thrust bearing testing machine, by rotating on a plane table made of SUJ2 steel provided by JIS G-4805 as an opponent material, under the conditions of a load of maximum contact stress a ball of 5.9 GPa, a number of rotation of 1200 rpm and oil bath lubrication due to turbine oil, test is kept going until a surface of a silicon nitride ball is peeled off to measure the rolling fatigue life (time period). These measurements are shown in Table 2.

The porosity, maximum pore diameter, range of particle diameters of dispersed titanium nitride particles, difference of long and short axes of titanium nitride particles and ratio of titanium nitride particles of which aspect ratio is in the range from 1.0 to 1.2 are measured in the following ways. That is, with an arbitrary unit area (100×100 μm), enlarged photographs are taken of a total of three points of one on a surface and two on a section. For unit areas each, the above values are measured to obtain an average value. For the fracture toughness, measurement is carried out on a plane portion after polishing above and below surfaces thereof.

TABLE 2

|  | A (*1) | B (*2) | C (*3) | D (*4) | E (*5) | F (*6) | G (*7) | H (*8) |
|---|---|---|---|---|---|---|---|---|
| Embodiment 2 | 0.1 | 1 | 0.05–0.5 | 0.1 | 100 | 270 | 7.3 | >400 |
| Comparative Example 4 | 0.1 | 1 | — | — | — | 230 | 6.3 | 300 |
| Comparative Example 5 | 0.1 | 1 | 0.2–2.5 | 0.3 | 90 | 220 | 6.3 | 350 |
| Comparative Example 6 | 0.4 | 2 | 0.08–1.2 | 0.5 | 48 | 200 | 5.7 | 200 |

(*1): Porosity (%)
(*2): Maximum Pore Diameter (μm)
(*3): Particle Size Range of TiN Particles (μm)
(*4): Difference of Long and Short Axes of TiN Particles (μm)
(*5): Ratio of TiN Particles of Low Aspect Ratio (%) (Ratio that TiN particles of which aspect ratio is in the range of from 1.0 to 1.2 occupy)
(*6): Crushing Strength (MPa)
(*7): Fracture Toughness (MPa · m$^{1/2}$)
(*8): Rolling Fatigue Life (h)

As evident from Table 2, silicon nitride wear resistant member for bearing balls of Embodiment 2 is excellent in all of crushing strength, fracture toughness and rolling fatigue life. In addition, there is found no coagulation between titanium nitride particles, a grain boundary phase being formed of Si—Y—Al—O—N compound. Furthermore, titanium nitride is not found to dissolve in the grain boundary phase. On the other hand, all of Comparative Examples 4, 5 and 6 are poor in properties than that of Embodiment 2. This is due to the same reasons mentioned for Comparative Examples 1–3.

Thus, it is found that the silicon nitride wear resistant member of the present invention is also effective for ones that have spherical shape like a bearing ball. In Embodiments 1 and 2, though there being a slight difference between the measurements of the same item such as fracture toughness or the like for instance, this is caused by the difference of the shapes of the sintered bodies.

Embodiments 3 through 25 and Comparative Examples 7 through 15

As Embodiments 3 through 25, powders of silicon nitride raw material, $Y_2O_3$, $Al_2O_3$, AlN and $TiO_2$ all of which are used in Embodiment 1, powders of various kinds of rare earth oxides of an average particle diameter of from 0.9 to 1.0 μm, of magnesium oxide of an average particle diameter of 0.5 μm and of various kinds of titanium compounds of an average particle diameter of from 0.4 to 0.5 μm are compounded, respectively, to be the respective composition ratios shown in Table 3 to prepare mixtures of raw materials. Powders of $TiO_2$ and various kinds of titanium compounds are shown in terms of titanium nitride. These are divided into three portions to be repeatedly added and mixed with an interval of 30 min.

Next, the obtained mixtures each of various kinds of raw materials, after molding and degreasing under the identical conditions with that of Embodiment 1, are heat treated (holding treatment) in a nitrogen gas atmosphere of 0.1 atm under the conditions shown in Table 4, followed by further sintering and HIP treatment under the conditions shown in Table 4 to prepare silicon nitride sintered bodies involving Embodiments 3 through 25, respectively.

On the other hand, as Comparative Example 7, except for sintering without holding at a temperature of from 1300 to 1450° C. in the middle of the sintering, under the identical conditions with Embodiment 1, a silicon nitride sintered body is prepared. In addition, as shown in Table 3, as Comparative Examples 8 through 14, mixtures of raw materials in which excessively less $Y_2O_3$ is added (Comparative Example 8), excessive $Y_2O_3$ is added (Comparative Example 9), excessively less $TiO_2$ is added (Comparative Example 10), excessive $TiO_2$ is added (Comparative Example 11), $Al_2O_3$ is not added (Comparative Example 12), excessive $Al_2O_3$ is added (Comparative Example 13), excessive AlN is added (Comparative Example 14) and excessive MgO is added (Comparative Example 15) are prepared, respectively.

Next, the obtained mixtures of raw materials each, after molding and degreasing under the identical conditions with that of Embodiment 1, are held in a nitrogen gas atmosphere of 0.1 atm under the conditions of 1400° C.×1 h, followed by further sintering and HIP treatment under the respective conditions shown in Table 4 to prepare silicon nitride sintered bodies involving Comparative Examples 7 through 15, respectively.

Of thus obtained silicon nitride sintered bodies of Embodiments 3 through 25 and Comparative Examples 7 through 15, the porosity, maximum pore diameter, range of particle diameters of dispersed titanium nitride particles, difference of long and short axes of titanium nitride particles, ratio of titanium nitride particles of which aspect ratio is in the range of from 1.0 to 1.2, three-point flexural strength at room temperature, fracture toughness and repetition rolling fatigue life are measured. These measurements are shown in Table 5, respectively.

TABLE 3

| | Raw Material Composition (% by mass) | | | | | |
|---|---|---|---|---|---|---|
| | $Si_3N_4$ | Rare Earth Oxide | $Al_2O_3$ | AlN | TiN Source | MgO |
| Embodiment | | | | | | |
| 3 | 87.5 | $Y_2O_3$ 5 | 3 | 3 | $TiO_2$ | 1.5 | — |
| 4 | 88.8 | $Y_2O_3$ 5 | 3 | 3 | $TiO_2$ | 0.2 | — |
| 5 | 84 | $Y_2O_3$ 5 | 5 | 3 | $TiO_2$ | 5 | — |
| 6 | 86.9 | $Y_2O_3$ 5 | 2 | 5 | $TiO_2$ | 3 | — |
| 7 | 86.5 | $Y_2O_3$ 5 | 2 | 2 | $TiO_2$ | 1.5 | — |
| 8 | 86.5 | $Y_2O_3$ 5 | 5 | 2 | $TiO_2$ | 1.5 | — |
| 9 | 86.5 | $Y_2O_3$ 5 | — | 5 | $TiO_2$ | 1.5 | — |
| 10 | 89.5 | $Y_2O_3$ 5 | — | — | $TiO_2$ | 1.5 | — |
| 11 | 97 | $Y_2O_3$ 0.5 | 5 | — | $TiO_2$ | 0.5 | — |
| 12 | 75 | $Y_2O_3$ 10 | 3 | 5 | $TiO_2$ | 5 | 1 |
| 13 | 87 | $Y_2O_3$ 5 | 3 | 3 | $TiO_2$ | 1 | 2 |
| 14 | 86 | $Y_2O_3$ 5 | 3 | 3 | $TiO_2$ | 1 | 2 |
| 15 | 86 | $Y_2O_3$ 5 | 3 | 3 | $TiO_2$ | 1 | — |
| 16 | 87.5 | $Y_2O_3$ 5 | 3 | 3 | TiC | 1.5 | — |
| 17 | 87.5 | $Y_2O_3$ 5 | 3 | 3 | TiN | 1.5 | — |
| 18 | 87.5 | $Y_2O_3$ 5 | 3 | 3 | $TiB_2$ | 1.5 | — |
| 19 | 87.5 | $Y_2O_3$ 5 | 3 | 3 | $TiSi_2$ | 1.5 | — |
| 20 | 87.5 | $Ce_2O_3$ 5 | 3 | 3 | $TiO_2$ | 1.5 | — |
| 21 | 87.5 | $Nd_2O_3$ 5 | 3 | 3 | $TiO_2$ | 1.5 | — |
| 22 | 87.5 | $Sm_2O_3$ 5 | 3 | 3 | $TiO_2$ | 1.5 | — |
| 23 | 87.5 | $Dy_2O_3$ 5 | 3 | 3 | $TiO_2$ | 1.5 | — |
| 24 | 85 | $Er_2O_3$ 7.5 | 3 | 3 | $TiO_2$ | 1.5 | — |
| 25 | 87.5 | $Yb_2O_3$ 5 | 3 | 3 | $TiO_2$ | 1.5 | — |
| Comparative Example | | | | | | |
| 7 | 87.5 | $Y_2O_3$ 5 | 3 | 3 | $TiO_2$ | 1.5 | — |
| 8 | 92.3 | $Y_2O_3$ 0.2 | 3 | 3 | $TiO_2$ | 1.5 | — |
| 9 | 77.5 | $Y_2O_3$ 15 | 3 | 3 | $TiO_2$ | 1.5 | — |
| 10 | 88.9 | $Y_2O_3$ 5 | 3 | 3 | $TiO_2$ | 0.1 | — |
| 11 | 82 | $Y_2O_3$ 5 | 3 | 3 | $TiO_2$ | 7 | — |
| 12 | 90.5 | $Y_2O_3$ 5 | — | 3 | $TiO_2$ | 1.5 | — |
| 13 | 83.5 | $Y_2O_3$ 5 | 7 | 3 | $TiO_2$ | 1.5 | — |
| 14 | 83.5 | $Y_2O_3$ 5 | 3 | 7 | $TiO_2$ | 1.5 | — |
| 15 | 83.5 | $Y_2O_3$ 5 | 7 | 3 | $TiO_2$ | 1.5 | 4 |

TABLE 4

| | Holding Conditions in the middle of Sintering | | Sintering Conditions | | | HIP Conditions | | |
|---|---|---|---|---|---|---|---|---|
| | Temperature (° C.) | Time (min) | Temperature (° C.) | Time (min) | Pressure (atm) | Temperature (° C.) | Time (min) | Pressure (atm) |
| Embodiment | | | | | | | | |
| 3 | 1300 | 45 | 1750 | 4 | 7 | — | — | — |
| 4 | 1400 | 90 | 1750 | 4 | 0.1 | 1700 | 1 | 1000 |
| 5 | 1450 | 120 | 1750 | 4 | 0.1 | 1700 | 1 | 1000 |
| 6 | 1350 | 60 | 1850 | 4 | 7 | 1800 | 1 | 1000 |
| 7 | 1400 | 120 | 1750 | 4 | 0.1 | 1700 | 1 | 300 |
| 8 | 1300 | 120 | 1600 | 4 | 0.1 | 1600 | 1 | 1000 |
| 9 | 1400 | 60 | 1750 | 4 | 0.1 | 1700 | 1 | 1000 |
| 10 | 1400 | 60 | 1750 | 4 | 0.1 | 1700 | 1 | 1000 |
| 11 | 1400 | 60 | 1900 | 4 | 7 | 1850 | 1 | 1000 |
| 12 | 1450 | 60 | 1700 | 4 | 0.1 | 1600 | 1 | 1000 |
| 13 | 1400 | 90 | 1700 | 4 | 0.1 | 1600 | 1 | 1000 |
| 14 | 1400 | 120 | 1750 | 4 | 7 | — | — | — |
| 15 | 1400 | 60 | 1700 | 4 | 0.1 | 1650 | 1 | 1000 |
| 16 | 1400 | 60 | 1750 | 4 | 0.1 | 1700 | 1 | 1000 |
| 17 | 1450 | 120 | 1750 | 4 | 0.1 | 1700 | 1 | 1000 |
| 18 | 1450 | 90 | 1750 | 4 | 0.1 | 1700 | 1 | 1000 |
| 19 | 1450 | 90 | 1750 | 4 | 0.1 | 1700 | 1 | 1000 |
| 20 | 1450 | 45 | 1750 | 4 | 0.1 | 1700 | 1 | 1000 |
| 21 | 1400 | 60 | 1750 | 4 | 0.1 | 1700 | 1 | 1000 |

TABLE 4-continued

| | Holding Conditions in the middle of Sintering | | Sintering Conditions | | | HIP Conditions | | |
|---|---|---|---|---|---|---|---|---|
| | Temperature (° C.) | Time (min) | Temperature (° C.) | Time (min) | Pressure (atm) | Temperature (° C.) | Time (min) | Pressure (atm) |
| 22 | 1400 | 60 | 1750 | 4 | 0.1 | 1700 | 1 | 1000 |
| 23 | 1450 | 60 | 1750 | 4 | 0.1 | 1700 | 1 | 1000 |
| 24 | 1450 | 60 | 1750 | 4 | 0.1 | 1700 | 1 | 1000 |
| 25 | 1400 | 120 | 1750 | 4 | 7 | 1700 | 1 | 1000 |
| Comparative Example | | | | | | | | |
| 7 | — | — | 1750 | 4 | 0.1 | 1700 | 1 | 1000 |
| 8 | 1400 | 60 | 1750 | 4 | 0.1 | 1700 | 1 | 1000 |
| 9 | 1400 | 60 | 1750 | 4 | 0.1 | 1700 | 1 | 1000 |
| 10 | 1400 | 60 | 1750 | 4 | 0.1 | 1700 | 1 | 1000 |
| 11 | 1400 | 60 | 1750 | 4 | 0.1 | 1700 | 1 | 1000 |
| 12 | 1400 | 60 | 1850 | 4 | 9 | 1700 | 1 | 1000 |
| 13 | 1400 | 60 | 1750 | 4 | 7 | 1700 | 1 | 1000 |
| 14 | 1400 | 60 | 1750 | 4 | 0.1 | 1700 | 1 | 1000 |
| 15 | 1400 | 60 | 1750 | 4 | 0.1 | 1700 | 1 | 1000 |

TABLE 5

| | A (*1) | B (*2) | C (*3) | D (*4) | E (*5) | F (*6) | G (*7) | H (*8) |
|---|---|---|---|---|---|---|---|---|
| Embodiment | | | | | | | | |
| 3 | 0.2 | 1.5 | 0.05–0.5 | 0.2 | 82 | 1050 | 7.0 | >1 × 10$^8$ |
| 4 | 0.05 | 0.5 | 0.05–0.3 | 0.1 | 100 | 1150 | 6.9 | >1 × 10$^8$ |
| 5 | 0.05 | 1 | 0.05–1.0 | 0.1 | 100 | 1250 | 7.2 | >1 × 10$^8$ |
| 6 | 0.06 | 1 | 0.05–0.6 | 0.2 | 100 | 1040 | 6.9 | >1 × 10$^8$ |
| 7 | 0.04 | 1 | 0.05–0.5 | 0.2 | 100 | 1160 | 7.0 | >1 × 10$^8$ |
| 8 | 0.05 | 0.5 | 0.05–0.5 | 0.2 | 100 | 1200 | 6.9 | >1 × 10$^8$ |
| 9 | 0.05 | 0.5 | 0.05–0.5 | 0.1 | 100 | 1300 | 7.4 | >1 × 10$^8$ |
| 10 | 0.05 | 0.6 | 0.05–0.5 | 0.1 | 100 | 1210 | 6.9 | >1 × 10$^8$ |
| 11 | 0.07 | 1 | 0.05–0.5 | 0.2 | 100 | 1020 | 6.8 | >1 × 10$^8$ |
| 12 | 0.06 | 0.5 | 0.07–1.0 | 0.2 | 100 | 1030 | 6.7 | >1 × 10$^8$ |
| 13 | 0.05 | 0.5 | 0.05–0.5 | 0.2 | 100 | 1280 | 7.2 | >1 × 10$^8$ |
| 14 | 0.3 | 1.5 | 0.05–0.5 | 0.1 | 100 | 1080 | 6.8 | >1 × 10$^8$ |
| 15 | 0.05 | 0.5 | 0.05–0.4 | 0.1 | 100 | 1250 | 7.0 | >1 × 10$^8$ |
| 16 | 0.05 | 0.5 | 0.05–0.5 | 0.1 | 100 | 1190 | 7.2 | >1 × 10$^8$ |
| 17 | 0.06 | 0.5 | 0.1–1 | 0.1 | 100 | 1100 | 6.9 | >1 × 10$^8$ |
| 18 | 0.05 | 0.5 | 0.1–0.8 | 0.1 | 100 | 1110 | 6.8 | >1 × 10$^8$ |
| 19 | 0.05 | 0.5 | 0.1–0.8 | 0.1 | 100 | 1100 | 6.6 | >1 × 10$^8$ |
| 20 | 0.05 | 0.5 | 0.05–0.5 | 0.1 | 95 | 1150 | 6.9 | >1 × 10$^8$ |
| 21 | 0.05 | 0.5 | 0.05–0.5 | 0.1 | 100 | 1160 | 6.8 | >1 × 10$^8$ |
| 22 | 0.05 | 0.5 | 0.05–0.5 | 0.1 | 100 | 1100 | 6.7 | >1 × 10$^8$ |
| 23 | 0.05 | 0.5 | 0.05–0.5 | 0.1 | 100 | 1190 | 7.0 | >1 × 10$^8$ |
| 24 | 0.05 | 0.5 | 0.05–0.5 | 0.1 | 100 | 1200 | 7.2 | >1 × 10$^8$ |
| 25 | 0.1 | 0.5 | 0.05–0.5 | 0.1 | 100 | 1120 | 6.9 | >1 × 10$^8$ |
| Comparative Example | | | | | | | | |
| 7 | 0.1 | 1 | 0.3–1.5 | 1.2 | 20 | 1100 | 6.7 | 8 × 10$^6$ |
| 8 | 2.2 | 3 | 0.08–1.5 | 0.2 | 100 | 700 | 5.1 | 6 × 10$^3$ |
| 9 | 0.1 | 1 | 0.05–0.3 | 0.2 | 100 | 920 | 5.8 | 8 × 10$^4$ |
| 10 | 0.1 | 1 | 0.05–0.3 | 0.2 | 100 | 1050 | 6.1 | 2 × 10$^6$ |
| 11 | 0.1 | 1.5 | 0.05–1.5 | 0.8 | 60 | 1000 | 6.5 | 9 × 10$^6$ |
| 12 | 1 | 2 | 0.07–1.0 | 0.2 | 100 | 850 | 5.9 | 5 × 10$^5$ |
| 13 | 0.1 | 1 | 0.05–0.5 | 0.2 | 100 | 900 | 5.8 | 6 × 10$^5$ |
| 14 | 0.1 | 1 | 0.05–0.5 | 0.2 | 100 | 900 | 5.6 | 9 × 10$^5$ |
| 15 | 0.1 | 1.5 | 0.05–0.5 | 0.2 | 100 | 970 | 6.0 | 7 × 10$^5$ |

(*1): Porosity (%)
(*2): Maximum Pore Diameter ($\mu$m)
(*3): Particle Size Range of TiN Particles ($\mu$m)
(*4): Difference of Long and Short Axes of TiN Particles ($\mu$m)
(*5): Ratio of TiN Particles of Low AP Ratio (%) (This is the ratio that TiN particles of which aspect ratio is in the range of from 1.0 to 1.2 occupy)
(*6): Three Point Flexural strength (MPa)
(*7): Fracture Toughness (MPa · m$^{1/2}$)
(*8): Rolling Fatigue Life (Times)

As evident from Table 5, it is found that all of the silicon nitride sintered bodies involving Embodiments of the present invention have excellent properties. Though not shown in the Table, all of the grain boundary phases are formed of Si—R—Al—O—N compound. In embodiments where MgO is added, the grain boundary phases are formed of Si—R—Al—Mg—O—N compound. In addition, there is found neither of the coagulation nor solution of the titanium nitride particles in all sintered bodies, that is, the titanium nitride particles are singly dispersed. The difference of the long and short axes of the titanium nitride particles is 0.2 $\mu$m or less.

In Embodiment 17 where powder of titanium nitride is added in advance, it is confirmed that, due to the lack of nitriding reaction of the titanium compound, a particle diameter of raw material powder affects. Accordingly, when titanium nitride is employed as the titanium compound, it is preferable to use one of which long axis is previously controlled to be 1 $\mu$m or less.

All of the silicon nitride sintered bodies of the respective Embodiments are found for the rolling fatigue life to be excellent such as 1×10$^8$ times or more. In addition, the fracture toughness and three point flexural strength are such high as 6.6 Mpa·m$^{1/2}$ or more and 1050 MPa or more, respectively. Whereas, the silicon nitride sintered bodies of the respective Comparative Examples are poorer in the above properties than the silicon nitride sintered bodies of the present invention.

Embodiments 26 through 48 and Comparative Examples 16 through 24

Except for, in addition to the use of the mixtures of raw materials identical with Embodiments 3 through 25, under the identical conditions with Embodiments 3 through 25, the heat-treatment, sintering and HIP treatment being implemented, similarly with Embodiment 2, silicon nitride sintered bodies for bearing ball involving Embodiments 26–48 are prepared.

Whereas, also for Comparative Examples 16 through 24, except for, in addition to the use of the mixtures of raw materials identical with Comparative Examples 7 through 15, under the identical conditions with Comparative Examples 7 through 15 (in Comparative Example 16, the holding treatment in the middle is not implemented), the sintering and HIP treatment being implemented, similarly with Embodiment 2, silicon nitride sintered bodies for bearing ball are prepared.

Of thus obtained silicon nitride balls due to Embodiments 26 through 48 and Comparative Examples 16 through 24, under the same conditions with Embodiment 2, the porosity, maximum pore diameter, range of particle diameters of dispersed titanium nitride particles, difference of long and short axes of titanium nitride particles, ratio of titanium nitride particles of which aspect ratio is in the range of from 1.0 to 1.2, crushing strength, fracture toughness and rolling fatigue life are measured. These measurements are shown in Table 6.

TABLE 6

| | A (*1) | B (*2) | C (*3) | D (*4) | E (*5) | F (*6) | G (*7) | H (*8) |
|---|---|---|---|---|---|---|---|---|
| Embodiment | | | | | | | | |
| 26 | 0.15 | 1.5 | 0.05–0.4 | 0.2 | 83 | 245 | 6.9 | >400 |
| 27 | 0.06 | 0.5 | 0.04–0.3 | 0.1 | 100 | 260 | 6.7 | >400 |
| 28 | 0.05 | 1 | 0.05–0.9 | 0.1 | 100 | 285 | 7.1 | >400 |
| 29 | 0.05 | 0.8 | 0.05–0.5 | 0.2 | 100 | 230 | 6.8 | >400 |
| 30 | 0.05 | 1 | 0.05–0.5 | 0.2 | 100 | 265 | 6.9 | >400 |
| 31 | 0.05 | 0.5 | 0.05–0.5 | 0.2 | 100 | 275 | 6.7 | >400 |
| 32 | 0.04 | 0.3 | 0.05–0.5 | 0.1 | 100 | 300 | 7.2 | >400 |
| 33 | 0.06 | 0.6 | 0.05–0.5 | 0.1 | 100 | 280 | 6.8 | >400 |
| 34 | 0.06 | 1 | 0.04–0.5 | 0.2 | 100 | 240 | 6.7 | >400 |
| 35 | 0.05 | 0.5 | 0.07–0.9 | 0.2 | 100 | 235 | 6.6 | >400 |
| 36 | 0.05 | 0.5 | 0.05–0.5 | 0.2 | 100 | 285 | 7.1 | >400 |
| 37 | 0.3 | 1.5 | 0.05–0.5 | 0.1 | 100 | 250 | 6.7 | >400 |
| 38 | 0.05 | 0.5 | 0.05–0.4 | 0.1 | 100 | 289 | 6.9 | >400 |
| 39 | 0.05 | 0.4 | 0.05–0.5 | 0.1 | 100 | 270 | 7.1 | >400 |
| 40 | 0.05 | 0.6 | 0.1–1 | 0.1 | 100 | 255 | 6.8 | >400 |
| 41 | 0.05 | 0.5 | 0.1–0.8 | 0.1 | 100 | 260 | 6.6 | >400 |
| 42 | 0.05 | 0.5 | 0.1–0.7 | 0.1 | 100 | 260 | 6.5 | >400 |
| 43 | 0.05 | 0.4 | 0.05–0.5 | 0.1 | 94 | 275 | 6.7 | >400 |
| 44 | 0.06 | 0.5 | 0.05–0.5 | 0.1 | 100 | 270 | 6.7 | >400 |
| 45 | 0.05 | 0.5 | 0.05–0.5 | 0.1 | 100 | 255 | 6.6 | >400 |
| 46 | 0.05 | 0.5 | 0.05–0.5 | 0.1 | 100 | 285 | 6.9 | >400 |
| 47 | 0.05 | 0.5 | 0.05–0.6 | 0.1 | 100 | 290 | 7.0 | >400 |
| 48 | 0.05 | 0.5 | 0.05–0.5 | 0.1 | 100 | 270 | 6.7 | >400 |
| Comparative Example | | | | | | | | |
| 16 | 0.06 | 1 | 0.3–1.5 | 1.2 | 21 | 260 | 6.5 | 365 |
| 17 | 2.3 | 3 | 0.08–1.5 | 0.2 | 100 | 155 | 5.0 | 75 |
| 18 | 0.1 | 1 | 0.05–0.4 | 0.2 | 100 | 220 | 5.6 | 150 |
| 19 | 0.1 | 1 | 0.05–0.3 | 0.2 | 100 | 240 | 5.9 | 330 |
| 20 | 0.2 | 1.5 | 0.05–1.5 | 0.8 | 58 | 230 | 6.4 | 378 |
| 21 | 1 | 2 | 0.06–1.0 | 0.2 | 100 | 180 | 5.8 | 167 |
| 22 | 0.1 | 1 | 0.05–0.5 | 0.2 | 100 | 200 | 5.7 | 180 |
| 23 | 0.1 | 1 | 0.05–0.5 | 0.2 | 100 | 200 | 5.4 | 205 |
| 24 | 0.1 | 1.5 | 0.05–0.5 | 0.2 | 100 | 215 | 5.8 | 194 |

(*1): Porosity (%)
(*2): Maximum Pore Diameter ($\mu$m)
(*3): Particle Size Range of TiN Particles ($\mu$m)
(*4): Difference of Long and Short Axes of TiN Particles ($\mu$m)
(*5): Ratio of TiN Particles of Low AP Ratio (%) (This is the ratio that TiN particles of which aspect ratio is in the range of from 1.0 to 1.2 occupy)
(*6): Crushing Strength (MPa)
(*7): Fracture Toughness (MPa · $m^{1/2}$)
(*8): Rolling Fatigue Life (hr)

As evident from Table 6, it is found that all of the bearing balls involving Embodiments of the present invention have excellent properties. Though not shown in the Table, all of the grain boundary phases are formed of Si—R—Al—O—N compound. In embodiments where MgO is added, the grain boundary phase is formed of Si—R0-Al—Mg—O—N compound. There is found neither of the coagulation nor solution of the titanium nitride particles, that is, the titanium nitride particles are independently dispersed. The difference of the long and short axes of the titanium nitride particles is 0.2 $\mu$m or less.

As explained above, according to the wear resistant members of the present invention, in addition to dispersing a prescribed amount of particles of titanium nitride in the silicon nitride sintered body, the long axis thereof is controlled to be 1 $\mu$m or less. Accordingly, properties such as strength, fracture toughness and rolling fatigue life necessary for the wear resistant member can be heightened. In particular, by forming the titanium nitride particles in edge-less and roundish spherical particles, sliding performance such as rolling fatigue life can be largely heightened. Such silicon nitride wear resistant members of the present invention are effective in a variety of uses. In particular, being excellent in the rolling fatigue life, it is suitable for the wear resistant member of which entire surface is a sliding surface such as in bearing balls.

While the invention herein disclosed has been described by means of specific embodiments and applications thereof, numerous modifications and variations could be made thereto by those skilled in the art without departing from the scope of the invention set forth in the claims.

What is claimed is:

1. A wear resistant member, comprising:
   a ball member consisting essentially of a silicon nitride sintered body;
   wherein the silicon nitride sintered body comprises from 75 to 97% by mass of silicon nitride, from 0.2 to 5% by mass of particles of titanium nitride and from 2 to 20% by mass of a grain boundary phase comprising a Si—R—Al—O—N compound, where R is a rare earth element;
   wherein the particles of titanium nitride have a long axis of 0.04 $\mu$m or more and 1 $\mu$m or less, and at least 80% by volume of the particles of titanium nitride have an aspect ratio in the range of from 1.0 to 1.2,
   wherein the ball member has a rolling fatigue life of 400 hr or more when tested with a thrust bearing testing machine, under the conditions of opponent material of a SUJ2 steel plane table provided by JIS G4805, a maximum contact stress of 5.9 GPa, a ball, and a number of rotation of 1200 rpm, and the rolling fatigue life is measured until a surface of the ball member is peeled off.

2. The wear resistant member as set forth in claim 1:
   wherein the particles of titanium nitride are dispersed in the silicon nitride sintered body as single particles.

3. The wear resistant member as set forth in claim 1:
wherein the titanium nitride is not dissolved in the silicon nitride and the grain boundary phase as a solid solution.

4. The wear resistant member as set forth in claim 1:
wherein the particles of titanium nitride are dispersed in the grain boundary phase.

5. The wear resistant member as set forth in claim 1:
wherein the particles of titanium nitride each have a roundish shape.

6. The wear resistant member as set forth in claim 1:
wherein the silicon nitride sintered body has a porosity of 0.5% or less and a maximum pore diameter of 2 $\mu$m or less.

7. The wear resistant member as set forth in claim 1:
wherein the ball member has a crushing strength of 200 MPa or more and a fracture toughness of 6.5 MPam or more.

8. The wear resistant member as set forth in claim 1:
wherein the grain boundary phase comprises from 0.5 to 10% by mass of a rare earth element in terms of oxide, from 0.1 to 5% by mass of aluminum oxide and 5% by mass or less of aluminum nitride.

9. The wear resistant member as set forth in claim 1:
wherein the silicon nitride sintered body further comprises at least one element selected from the group consisting of magnesium, zirconium, hafnium and tungsten in the range of from 0.1 to 5% by mass in terms of oxide.

10. The wear resistant member as set forth in claim 1:
wherein the wear resistant member is a bearing member.

11. A method of manufacturing the wear resistant member of claim 1, comprising the steps of:
mixing silicon nitride powder comprising 1.7% by mass or less of oxygen and 90% by mass or more of α-silicon nitride having an average particle diameter of 1.0 $\mu$m or less, from 0.5 to 10% by mass of a rare earth compound in terms of oxide, from 0.2 to 5% by mass of titanium nitride having an average particle diameter of 0.7 $\mu$m or less or a titanium compound that forms titanium nitride by sintering in terms of titanium nitride, from 0.1 to 5% by mass of aluminum oxide and 5% by mass or less of aluminum nitride, thereby providing mixture of raw materials;

molding the mixture of raw materials into a desired shape;

heat treating, after degreasing the molded body obtained after said molding, at a temperature in the range of from 1300 to 1450° C; and sintering the heat-treated molded body at a temperature in the range of from 1600 to 1900° C.

12. The method of manufacturing a wear resistant member as set forth in claim 11:
wherein the mixture of raw materials is added in a plurality of portions to the silicon nitride powder, the titanium nitride or the titanium compound that forms titanium nitride due to the sintering.

13. The method of manufacturing a wear resistant member as set forth in claim 11:
wherein the mixture of raw materials contains titanium oxide powder having an average particle diameter of 0.5 $\mu$m or less in the range of from 0.2 to 5% by mass in terms of titanium nitride.

14. The method of manufacturing a wear resistant member as set forth in claim 11, further comprising a step of:
carrying out a HIP treatment under a pressure of 300 atm or more in a non-oxidizing atmosphere at a temperature in the range of from 1600 to 1850° C.

15. The wear resistant member as set forth in claim 1:
wherein the silicon nitride sintered body contains no magnesium oxides, nitrides, borides or silicides.

16. The wear resistant member as set forth in claim 1:
wherein the silicon nitride sintered body is formed by sintering a mixture comprising from 0.5 to 10% by mass of a rare earth compound in terms of oxide, from 0.2 to 5% by mass of titanium nitride or a titanium compound that forms titanium nitride by sintering in terms of titanium nitride, from 0.1 to 5% by mass of aluminum oxide, 5% by mass or less of aluminum nitride and the balance of silicon nitride.

* * * * *